United States Patent
Wei et al.

(10) Patent No.: US 12,531,630 B2
(45) Date of Patent: *Jan. 20, 2026

(54) INFRASTRUCTURE EQUIPMENT, COMMUNICATIONS DEVICES AND METHODS

(71) Applicant: Sony Group Corporation, Tokyo (JP)

(72) Inventors: Yuxin Wei, Basingstoke (GB); Samuel Asangbeng Atungsiri, Basingstoke (GB); Hideji Wakabayashi, Basingstoke (GB); Vivek Sharma, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/670,059

(22) Filed: May 21, 2024

(65) Prior Publication Data

US 2024/0305361 A1 Sep. 12, 2024

Related U.S. Application Data

(63) Continuation of application No. 17/764,539, filed as application No. PCT/EP2020/076320 on Sep. 21, 2020, now Pat. No. 12,009,901.

(30) Foreign Application Priority Data

Oct. 2, 2019 (EP) .................................... 19201208

(51) Int. Cl.
*H04B 1/38* (2015.01)
*H04B 7/185* (2006.01)
(Continued)

(52) U.S. Cl.
CPC ....... *H04B 7/18504* (2013.01); *H04B 7/1851* (2013.01); *H04W 48/16* (2013.01)

(58) Field of Classification Search
CPC ............. H04B 7/18504; H04B 7/1851; H04B 7/2041; H04W 48/16
(Continued)

(56) References Cited

U.S. PATENT DOCUMENTS

| | | | |
|---|---|---|---|
| 12,009,901 B2* | 6/2024 | Wei ....................... | H04B 7/1851 |
| 2013/0121229 A1 | 5/2013 | Väre et al. | |
| 2019/0245614 A1* | 8/2019 | Lucky .................. | H04B 7/2041 |

FOREIGN PATENT DOCUMENTS

WO 2018/052744 A2 3/2018

OTHER PUBLICATIONS

International Search Report and Written Opinion mailed on Dec. 9, 2020, received for PCT Application PCT/EP2020/076320, Filed on Sep. 21, 2020, 15 pages.
(Continued)

*Primary Examiner* — Phuong Phu
(74) *Attorney, Agent, or Firm* — XSENSUS LLP

(57) ABSTRACT

A method comprising transmitting signals to one or more communications devices within a radio coverage area provided by infrastructure equipment, the infrastructure equipment forming either part of a non-terrestrial network of a wireless communications network and wherein the radio coverage area forms a spot beam of the non-terrestrial network, or part of a terrestrial network and wherein the radio coverage area is a cell of a terrestrial network, wherein the transmitting the signals includes transmitting signalling information indicating that one or more neighbouring coverage areas to the radio coverage area provided by the infrastructure equipment are either formed by a spot beam of a non-terrestrial network, a spot beam of the non-terrestrial network of which the infrastructure equipment forms part, a cell of a terrestrial network or a cell of the terrestrial network of which the infrastructure equipment forms part.

20 Claims, 4 Drawing Sheets

(51) Int. Cl.
*H04L 5/16* (2006.01)
*H04W 48/16* (2009.01)
(58) Field of Classification Search
USPC .......................................... 375/219, 220, 211
See application file for complete search history.

(56) References Cited

OTHER PUBLICATIONS

Nokia, "Report of Email Discussion [106#72] [NR/NTN] TP on NTN-TN Service Continuity", 3GPP TSG-RAN WG2 Meeting #107, R2-1910692, Aug. 26-30, 2019, 16 pages.
Nokia et al., "Merged TP on TN-NTN service continuity scenarios", 3GPP TSG-RAN WG2 Meeting #106, R2-1908242, May 13-17, 2019, 4 pages.
Sony, "Service continuity in NTN", 3GPP TSG RAN WG2 Meeting #107, R2-1909909, Aug. 26-30, 2019, 3 pages.
3GPP, "Study on Scenarios and Requirements for Next Generation Access Technologies; (Release 14)", 3GPP TR 38.913 V14.3.0, Jun. 2017, pp. 1-39.
Holma et al., "LTE for UMTS OFDMA and SC-FDMA Based Radio Access", John Wiley & Sons, 2009, 232 pages.
3GPP, "Study on New Radio (NR) to support non terrestrial networks (Release 15)", 3GPP TR 38.811 V0.3.0, Dec. 2017, pp. 1-56.
NTT Docomo, Inc., "Revised WID on New Radio Access Technology", 3GPP TSG RAN Meeting #78, RP-172834, Dec. 18-21, 2017, 11 pages.
3GPP, "Study on New Radio (NR) to support non-terrestrial networks (Release 15)", 3GPP TR 38.811 V15.2.0, Sep. 2019, pp. 1-126.

* cited by examiner

INFRASTRUCTURE EQUIPMENT, COMMUNICATIONS DEVICES AND METHODS

CROSS-REFERENCE TO RELATED APPLICATIONS

The present application is a continuation of U.S. application Ser. No. 17/764,539, filed Mar. 29, 2022, which is based on PCT filing PCT/EP2020/076320, filed Sep. 21, 2020, which claims priority to EP 19201208.6, filed Oct. 2, 2019, the entire contents of each are incorporated herein by reference.

BACKGROUND

Field of Disclosure

The present disclosure relates generally to communications devices, infrastructure equipment and methods of operating communications devices and infrastructure equipment and specifically to methods of providing information about infrastructure equipment which may be of terrestrial or non-terrestrial networks to communications devices.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/ new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method for operating an infrastructure equipment forming part of a wireless communications network. The method comprises transmitting signals to one or more communications devices within a radio coverage area provided by the infrastructure equipment via a wireless access interface of the wireless communications network for transmitting signals to the one or more communications devices or receiving signals from the one or more communication devices, the infrastructure equipment forming either part of a non-terrestrial network of the wireless communications network and wherein the radio coverage area forms a spot beam or a cell of the non-terrestrial network, or part of a terrestrial network and wherein the radio coverage area is a cell of a terrestrial network, wherein the transmitting the signals includes transmitting signalling information indicating that one or more neighbouring coverage areas to the radio coverage area provided by the infrastructure equipment are either formed by a spot beam of a non-terrestrial network, a spot beam of the non-terrestrial network of which the infrastructure equipment forms part, a cell of a non-terrestrial network or a cell of the non-terrestrial network of which the infrastructure equipment forms part, a cell of a terrestrial network or a cell of the terrestrial network of which the infrastructure equipment forms part. By transmitting an indication to the one or more communications devices of whether the one or more neighbouring coverage areas to the radio coverage area provided by the infrastructure equipment serving the communications devices are either formed by a spot beam or cell of a non-terrestrial network or a cell of a terrestrial network, the communications devices can adapt a cell selection/reselection procedure to use different selection criteria such as compensating for a likely strength of signals transmitted by a non-terrestrial network to make selection of an non-terrestrial network or terrestrial network more likely.

Embodiments of the present technique, which further relate to communications devices, methods of operating communications devices and infrastructure equipment and circuitry for communications devices and infrastructure equipment, allow for the transmission of system information or dedicated signalling by both terrestrial and non-terrestrial infrastructure equipment to communications devices in ways in which the communication device's decision to re-select or handover to a new non-terrestrial or terrestrial cell may be better informed.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
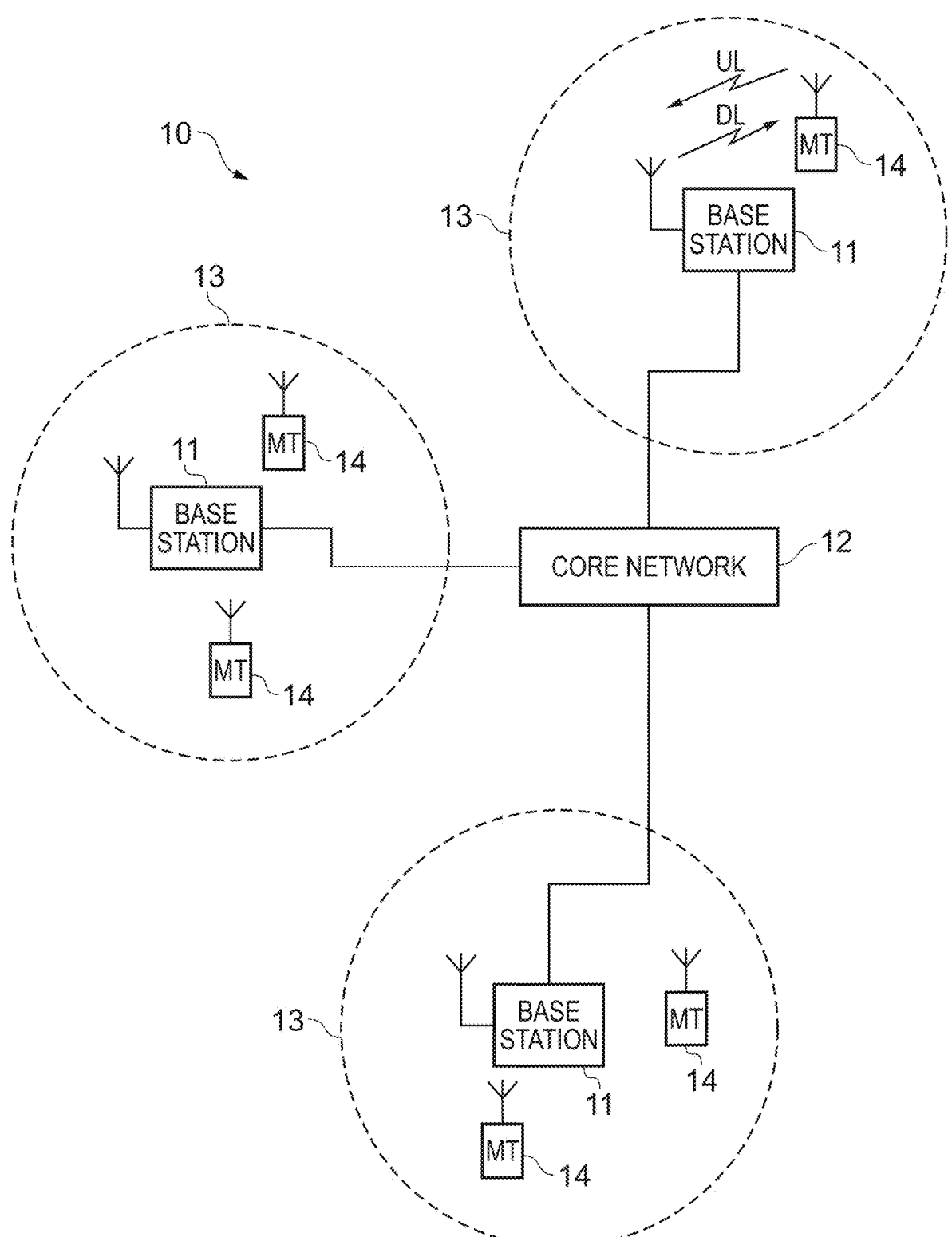
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/cNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:
  Enhanced Mobile Broadband (eMBB)
  Massive Machine Type Communications (mMTC)
  Ultra Reliable & Low Latency Communications (URLLC) [3]

eMBB services are characterised by high capacity with a requirement to support up to 20 Gb/s. The requirement for URLLC is a reliability of $1-10^{-5}$ (99.999%) for one transmission of a relatively short packet, for example a 32 byte packet with a user plane latency of 1 ms [4].

The elements of the wireless access network shown in FIG. 1 may be equally applied to a 5G new RAT configuration, except that a change in terminology may be applied as mentioned above.

Figure 2:
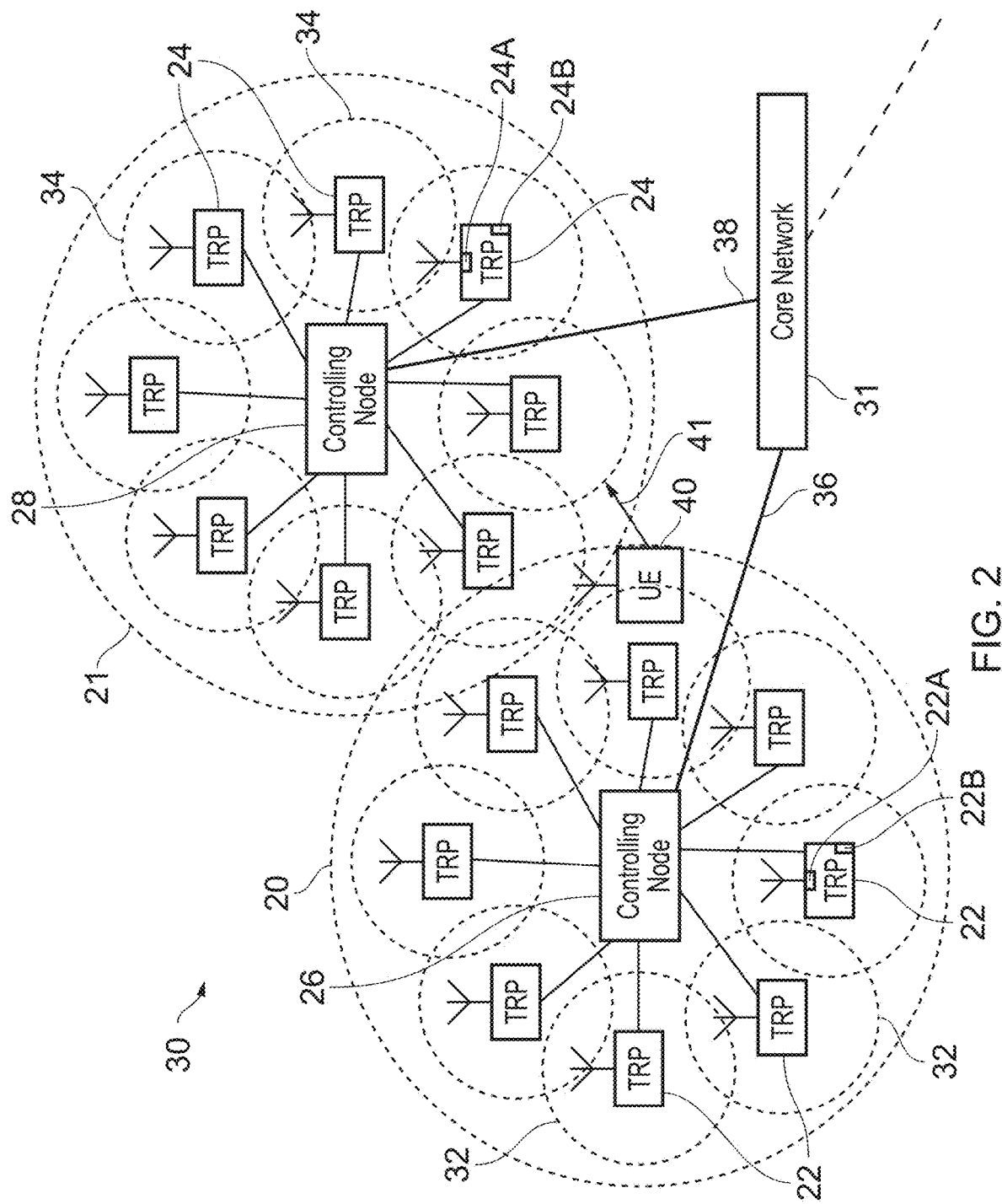
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Non-Terrestrial Networks (NTNs)

Figure 3:
FIG. 3 is reproduced from [1], and illustrates a first example of an NTN featuring an access networking service relay node and based on a satellite/aerial with a bent pipe payload.
Figure 4:
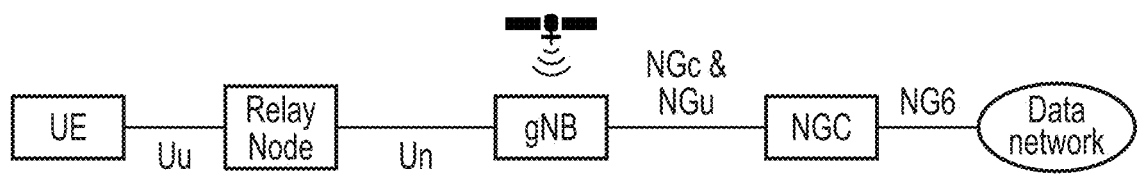
FIG. 4 is reproduced from [1], and illustrates a second example of an NTN featuring an access networking service relay node and based on a satellite/aerial connected to a gNodeB.

An overview of NR-NTN can be found in [1], and much of the following wording, along with FIGS. 3 and 4, has been reproduced from that document as a way of background.

As a result of the wide service coverage capabilities and reduced vulnerability of space/airborne vehicles to physical attacks and natural disasters, Non-Terrestrial Networks are expected to:

foster the roll out of 5G service in un-served areas that cannot be covered by terrestrial 5G network (isolated/remote areas, on board aircrafts or vessels) and under-served areas (e.g. sub-urban/rural areas) to upgrade the performance of limited terrestrial networks in cost effective manner, reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications, and to enable 5G network scalability by providing efficient multicast/broadcast resources for data delivery towards the network edges or even user terminal.

The benefits relate to either Non-Terrestrial networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive.

FIG. 3 illustrates a first example of an NTN featuring an access networking service relay nodes and based on a satellite/aerial with a bent pipe payload, meaning that the same data is sent back down to Earth as is received by the satellite/aerial, with only frequency or amplification changing; i.e. acting like a pipe with a u-bend. In this example NTN, the satellite or the aerial will therefore relay a "satellite friendly" NR signal between the gNodeB and the relay nodes in a transparent manner.

FIG. 4 illustrates a second example of an NTN featuring an access networking service relay nodes and based on a satellite/aerial connected to a gNodeB. In this example NTN, the satellite or aerial embarks full or part of a gNodeB to generate or receive a "satellite friendly" NR signal to/form the relay nodes. This requires sufficient on-board processing capabilities to be able to include a gNodeB or relay node functionality.

Relay node (RN) related use cases such as those shown in FIGS. 3 and 4 will play an important role in the commercial deployment of NTN; i.e. relay nodes mounted on high speed trains, relay nodes mounted in cruise ships, relay nodes at home/office and relay nodes mounted on airliners. It should be well understood by those skilled in the art that the proposed solutions of embodiments of the present technique could be equally applied to conventional UEs and RNs.

Figure 5:
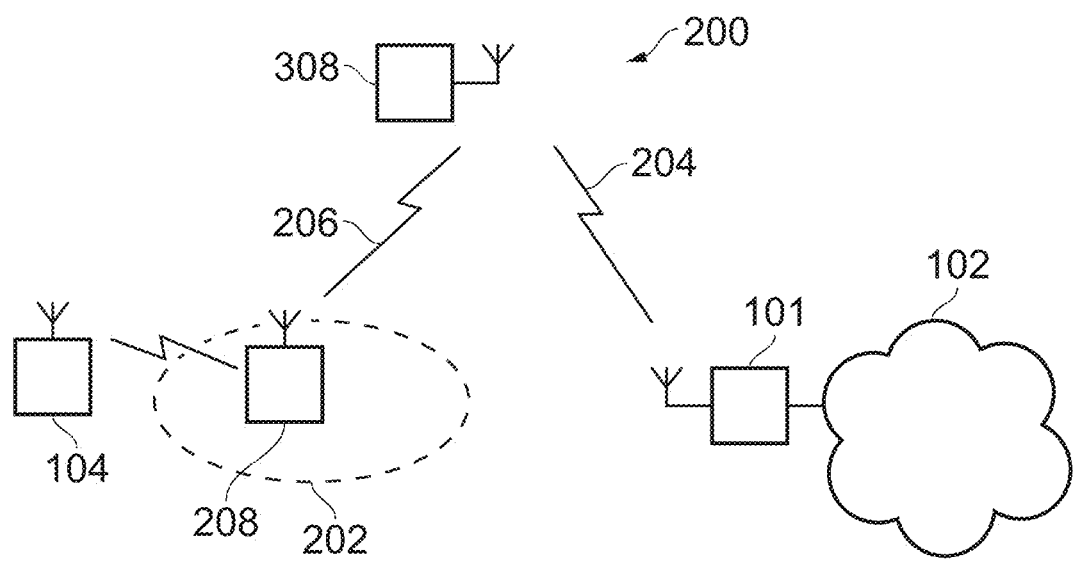
FIG. 5 schematically shows an example of a wireless communications system which may be configured to operate in accordance with embodiments of the present disclosure.

FIG. 5 schematically shows an example of a wireless communications system 200 which may be configured to operate in accordance with embodiments of the present disclosure. The wireless communications system 200 in this example is based broadly around an LTE-type or 5G-type architecture. Many aspects of the operation of the wireless communications system/network 200 are known and understood and are not described here in detail in the interest of brevity. Operational aspects of the wireless communications system 200 which are not specifically described herein may be implemented in accordance with any known techniques, for example according to the current LTE-standards or the proposed 5G standards.

The wireless communications system 200 comprises a core network part 102 (which may be a 5G core network or a NG core network) in communicative connection with a radio network part. The radio network part comprises a base station (g-node B) 101 connected to a non-terrestrial network part 308. The non-terrestrial network part 308 may be an example of infrastructure equipment. Alternatively, or in addition, the non-terrestrial network part 308 may be mounted on a satellite vehicle or on an airborne vehicle.

The non-terrestrial network part 308 may communicate with a communications device 208, located within a cell 202, by means of a wireless access interface provided by a wireless communications link 206. For example, the cell 202 may correspond to the coverage area of a spot beam generated by the non-terrestrial network part 308. The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit (GEO) such that the non-terrestrial network part 308 does not move with respect to a fixed point on the Earth's surface. The geo-stationary earth orbit may be approximately 36,786 km above the Earth's equator. The satellite may alternatively be in a low-earth orbit (LEO), in which the non-terrestrial network part 308 may complete an orbit of the Earth relatively quickly, thus providing moving cell coverage. Alternatively, the satellite may be in a non-geostationary orbit (NGSO), so that the non-terrestrial network part 308 moves with respect to a fixed point on the Earth's surface. The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 5, the base station 101 is shown as ground-based, and connected to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 206. Similarly, the non-terrestrial network part 308 receives signals representing uplink data transmitted by the communications device 206 via the wireless access interface comprising the wireless communications link 206 and transmits signals representing the uplink data to the base station 101 on the wireless communications link 204. The wireless communications links 204, 206 may operate at a same frequency, or may operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206. Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

The non-terrestrial network part 308 may be configured to perform some of the functionality conventionally carried out by the base station 101. In particular, latency-sensitive functionality (such as acknowledging a receipt of the uplink data, or responding to a RACH request) may be performed by the non-terrestrial network part 308 instead of by the base station 101.

The base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In such co-located arrangements, a wireless communications link between the base station 101 and a ground station (not shown) may provide connectivity between the base station 101 and the core network part 102.

The communications device 208 shown in FIG. 5 may be configured to act as a relay node. That is, it may provide connectivity to one or more terminal devices such as the terminal device 104. When acting as a relay node, the communications device 208 transmits and receives data to and from the terminal device 104, and relays it, via the non-terrestrial network part 308 to the base station 101. The communications device 208, acting as a relay node, may thus provide connectivity to the core network part 102 for terminal devices which are within a transmission range of the communications device 208.

It will be apparent to those skilled in the art that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which communicates with the non-terrestrial network part 308.

There is a need to ensure that connectivity for the communications device 208 with the base station 101 can be maintained, in light of the movement of the communications device 208, the movement of the non-terrestrial network part 308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station. However, such conventional measurement-based algorithms may be unsuitable for cells generated by means of the transmission of beams from a non-terrestrial network part, such as the cell 202 generated by the non-terrestrial network part 308. In particular, path loss may be primarily dependent on an altitude of the non-terrestrial network part 308 and may vary only to a very limited extent (if at all) at the surface of the Earth, within the coverage region of the cell 202. As a result, the strength of a received signal may be always lower than that from a terrestrial base station, which thus will always be selected when available.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the earth. Similarly, it may be expected that the communications device 208 may be mounted on an airborne vehicle itself, having a ground speed of several hundreds of kilometres per hour.

In cell reselection procedures, a UE should follow and base decisions on certain criteria and on configuration of networks. A high-level guideline on such criteria may be that a UE first considers absolute/dedicated priority, then radio link quality, then cell accessibility etc. When a neighbouring cell is a satellite (i.e. non-terrestrial) cell, its radio link quality is likely to be relatively even (flat) across its entire coverage region when compared a terrestrial cell, where there is more variation in the radio link quality across the coverage region. This may lead the UE to tend to always select NTN cells or always select terrestrial network (TN) cells when it has a choice, depending on the neighbour cell's radio conditions distribution or simply declare itself as out of coverage when no terrestrial cell signal strength is above the receiver sensitivity. This problem can't be solved by simply designating priorities of neighbouring cells.

There may be other deployment scenarios, whereby a user may wish to stay on their preferred network (i.e. Home Public Land Mobile Network (HPLMN)). For example, a UE of a customer having an NTN as its HPLMN and having potential visited networks that are both NTN and TN networks may prefer to stay on an NTN HPLMN. It is then up to the network to provide frequency priorities according to user subscriptions. Normally frequencies allocated for NTN networks may be separate from those allocated for TN networks. However, this may not always be the case in future systems, and so there is a need for signalling flexibility or independence of signalling from frequency allocation.

Embodiments of the present technique propose solutions that allow for a communications device to make a more informed and efficient decision when performing cell re-selection or handover procedures, when both NTN and TN networks may be involved in the cell re-selection or handover.

Signalling Information Enhancement for NTN

Figure 6:
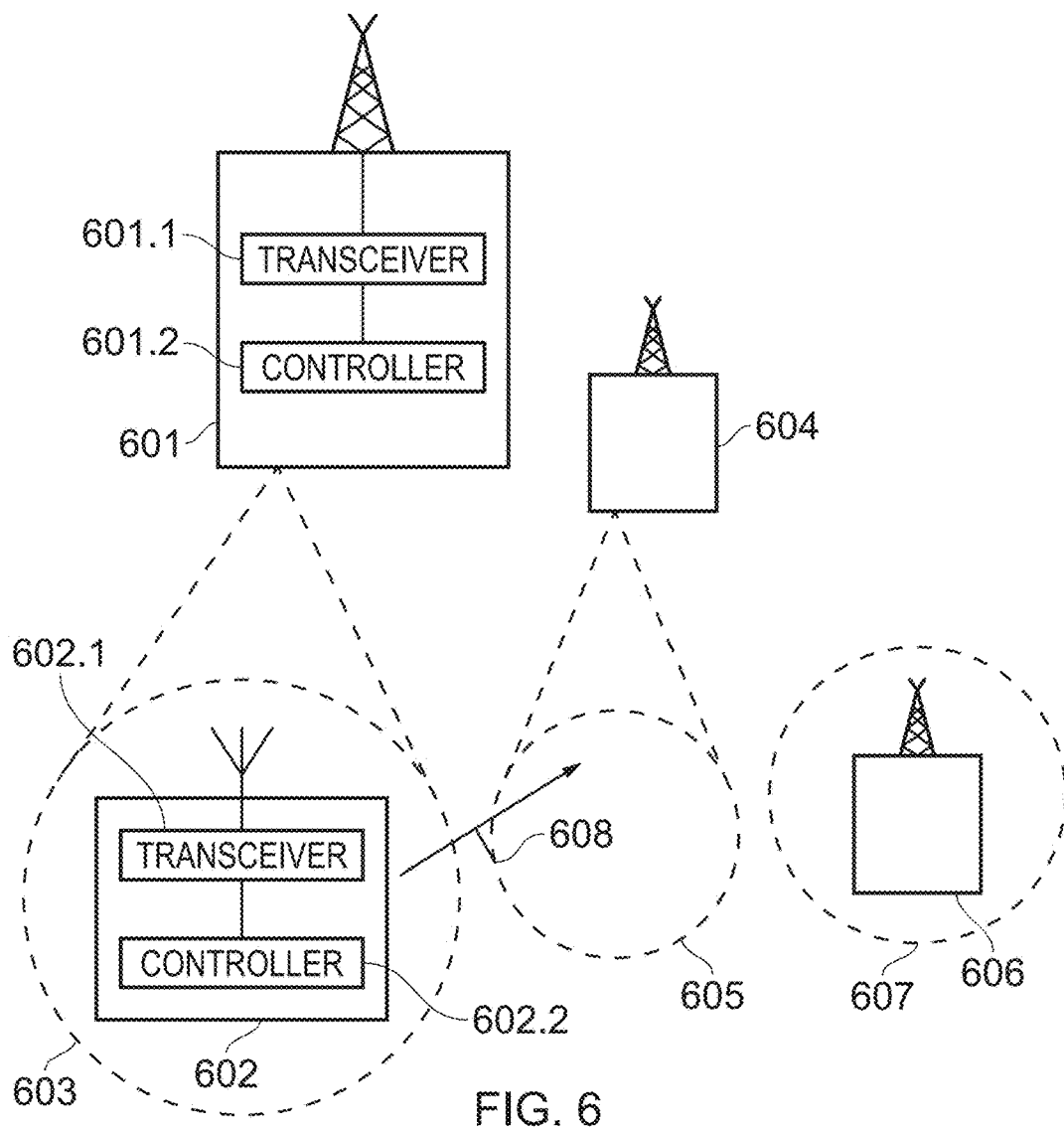
FIG. 6 shows schematic representation of a wireless communications network comprising an infrastructure equipment and a plurality of communications devices in accordance with embodiments of the present technique.

Such a reduction in the control signalling overheads of NTNs may be provided by embodiments of the present technique. FIG. 6 shows schematic representation of a wireless communications network comprising an infrastructure equipment 601 and a communications device 602 which is served by the infrastructure equipment 601 in accordance with embodiments of the present technique. The infrastructure equipment 601 may be a non-terrestrial network part (e.g. a satellite) configured to transmit one or more spot beams or cell to provide a wireless access interface for transmitting signals to and receiving signals representing data from the communications device 602 within a radio coverage region formed by the spot beams or cell, or the infrastructure equipment may be a terrestrial network part (e.g. a ground-based eNodeB) configured to control a cell providing the radio coverage region. In the following description reference to a coverage area being a spot beam formed by a non-terrestrial network part should also be interpreted as being a cell as an alternative because each spot beam may have a cell ID, in which case there is cell selection/reselection.

The infrastructure equipment 601 and the communications device 602 each comprises a transceiver (or transceiver circuitry) 601.1, 602.1, and a controller (or controller circuitry) 601.2, 602.2. Each of the controllers 601.2, 602.2 may be, for example, a microprocessor, a CPU, or a dedicated chipset, etc.

Specifically, as is shown by FIG. 6, the transceiver circuitry 601.1 and the controller circuitry 601.2 of the infrastructure equipment 601 are configured in combination to transmit signals to one or more communications devices 602 within a radio coverage area 603 provided by the infrastructure equipment 602 via a wireless access interface of the wireless communications network for transmitting signals to the one or more communications devices 602 or receiving signals from the one or more communication devices 602, the infrastructure equipment 601 forming either part of a non-terrestrial network of the wireless communications network and wherein the radio coverage area 603 forms a spot beam of the non-terrestrial network, or part of a terrestrial network and wherein the radio coverage area 603 is a cell of a terrestrial network, wherein the transmitting the signals includes transmitting signalling information indicating that one or more neighbouring coverage areas 605, 607 to the radio coverage area 603 provided by the infrastructure equipment 601 are either formed by a spot beam 605 of a non-terrestrial network, a spot beam of the non-terrestrial network of which the infrastructure equipment 601 forms part, a cell 607 of a terrestrial network or a cell of the terrestrial network of which the infrastructure equipment 601 forms part.

In FIG. 6, the neighbouring radio coverage area which is formed by a spot beam 605 of a non-terrestrial network may be controlled by a non-terrestrial infrastructure equipment (e.g. a satellite) 604, while the neighbouring radio coverage area which is formed by a cell 607 of a terrestrial network may be controlled by a terrestrial infrastructure equipment (e.g. an eNodeB) 606. Such signalling information indicating how the one or more neighbouring coverage areas 605, 607 are formed (e.g. either by a cell of a terrestrial or a spot beam of a non-terrestrial network, both of which the serving infrastructure equipment 601 may or may not form part, may be of particular relevance to a communications device 602 which is moving 608 towards the edge of or away from the radio coverage region 603, and needs to determine whether performing a cell selection/reselection or handover procedure to the neighbouring cells 604/605 or 606/607 would be beneficial.

Here, the communications device may be configured to receive signals from a first infrastructure equipment within a radio coverage area provided by the first infrastructure equipment via a wireless access interface of the wireless communications network for transmitting signals to the first infrastructure equipment or receiving signals from the first infrastructure equipment. The first infrastructure equipment can form either part of a non-terrestrial network of the wireless communications network, the radio coverage area forming a spot beam or a cell of the non-terrestrial network, or part of a terrestrial network, the radio coverage area being a cell of a terrestrial network. The communications device is configured, to receive, while the communications device is in an idle state, signalling information indicating that one or more neighbouring coverage areas to the radio coverage area provided by the first infrastructure equipment are either formed by a spot beam or a cell of a non-terrestrial network, a spot beam or a cell of the non-terrestrial network of which the first infrastructure equipment forms part, a cell of a terrestrial network or a cell of the terrestrial network of which the first infrastructure equipment forms part. The communications device is configured to determine, based at least in part on the received signalling information, whether the communications device should perform a cell selection or reselection procedure to select or reselect a second infrastructure equipment providing one of the neighbouring coverage areas. Thus in idle mode/state the communications device can select/reselect one of the neighbouring coverage areas in accordance with whether the neighbouring coverage area is provided by a non-terrestrial network (NTN) or a terrestrial network (TN), for example by compensating for selecting criteria in accordance with whether the coverage area is formed by an NTN or a TN. Once selected the communications device may move into a connected state to receive signals from the second infrastructure equipment instead of the first infrastructure equipment and potentially transmits signals to the second infrastructure equipment instead of the first infrastructure equipment.

An indication of whether a neighbouring cell is an NTN cell or TN cell, or whether the neighbouring cell operates within frequencies used for NTN or for TN, may be included in the system information of the serving cell (which itself may be either an NTN or TN cell), in order to assist a UE in an idle mode (such as RRC_IDLE) to perform cell selection and reselection. For example, this may entail just an extra single bit per neighbouring cell in the system information, indicating whether that neighbouring cell is an NTN or TN cell, or whether the neighbouring cell is operating in frequencies designated for either NTN or TN. In other words, the transmitting the signalling information comprises broadcasting the signalling information as part of system information broadcast by the infrastructure equipment for the one or more communications devices to access the wireless access interface of the wireless communications network.

Such an indication may be included per frequency, or may alternatively be included per cell. Normally, a GEO beam or cell is larger in size than those of, for example, a LEO satellite, and so providing an indication per cell is sufficient. However, for LEO satellites, for example, the cell size may be much smaller and so providing an indication per cell becomes less efficient as the signalling load is increased. Here, including such an indication per frequency may be better. In other words, the signalling information includes an indication of at least one frequency range associated with non-terrestrial networks, and an indication of at least one frequency range associated with terrestrial networks.

In a typical deployment, a UE located at the cell edge and losing coverage of a TN cell may have a very low RSRP (for example, −110 dBm) with respect to signals received from serving cell. The UE may declare that it is out of coverage if no neighbouring cells are found. If the UE is informed that an NTN cell or NTN frequency exists in the vicinity, then the UE may start performing measurements of the NTN cell based on NTN cell selection/reselection criteria, for example an NTN cell having an RSRP of at least −120 dBm, which may be lower than a normal TN cell RSRP cell selection/reselection threshold. In other words, determining whether the communications device should perform the cell re-selection procedure comprises determining whether at least one communications parameter of the second infrastructure equipment exceeds a threshold or receiver sensitivity or similar, wherein the threshold has a different value dependent on whether second infrastructure equipment is a terrestrial network part or a non-terrestrial network part. Thus, embodiments of the present technique propose that a UE will be able to switch from TN cell selection/reselection criteria to NTN cell selection/reselection criteria.

According to one example embodiment therefore the communications device is configured to receive signals from each of the one or more neighbouring coverage areas, to identify based on a frequency of the received signals, whether each of the one or more neighbouring coverage areas are either formed by a non-terrestrial network or a terrestrial network depending on whether the frequency of the received signals is within the at least one frequency range associated with non-terrestrial networks and the at least one frequency range associated with terrestrial networks, and to adapt the selection or re-selection procedure to select or to re-select the second infrastructure equipment providing one of the neighbouring coverage areas depending on whether the second infrastructure equipment forms part of a non-terrestrial network or a terrestrial network.

In one example the adapting the selection or re-selection procedure to select or to re-select the second infrastructure equipment includes determining a communications parameter derived from the signals received from each of the neighbouring coverage areas, comparing the determined communications parameter for each of the one or more neighbouring coverage areas and the radio coverage area of the first infrastructure equipment with a threshold or with each other, and selecting the neighbouring coverage area provided by the second infrastructure equipment from the comparison, by adapting one of the threshold or the determined communications parameter for the one or more neighbouring coverage areas or the radio coverage area of the first infrastructure equipment in accordance with whether the one or more neighbouring coverage areas or the radio coverage area form part of the a non-terrestrial network or a terrestrial network. The communications parameter is a received signal strength. Furthermore the adapting one of the threshold or the determined communications parameter for the one or more neighbouring coverage areas or the radio coverage area of the first infrastructure equipment compensates for a lower expected received signal strength from a non-terrestrial network.

If LEO and GEO have different receiver sensitivity thresholds and different entry thresholds, which may indeed be the case, then such an indication is required separately for LEO and GEO networks. That is, when indicating that the neighbouring cell is an NTN cell, a further indication is required as to whether that NTN cell is controlled by a GEO satellite or a LEO satellite. In other words, when the signalling information indicates that one or more of the neighbouring coverage areas are formed by a spot beam/cell of a non-terrestrial network or a spot beam of the non-terrestrial network of which the infrastructure equipment forms part, the signalling information further includes an indication of whether the neighbouring cell is provided by a geo-stationary earth orbit, GEO, satellite or a low-earth orbit, LEO, satellite.

Alternatively to those arrangements described above, the indication of whether a neighbouring cell is an NTN cell or TN cell, or whether the neighbouring cell operates within frequencies used for NTN or for TN, may be included in dedicated signalling transmitted by the serving cell to the UE and may be based on UE reported NTN capabilities. This dedicated signalling may be any such dedicated signalling, but for example might be an RRC connection release message. In other words, the transmitting the signalling information comprises transmitting the signalling information as part of a radio resource configuration release message to one of the communications devices to release radio resources of the wireless access interface for transmitting or receiving data in connected mode.

In some arrangements of embodiments of the present technique, where the infrastructure equipment is part of a non-terrestrial network, the radio coverage region formed by the spot beam may vary over time in accordance with a motion of the infrastructure equipment with respect to the surface of the Earth, for example if the infrastructure equipment is, or forms part of, a LEO satellite or other moving object. Alternatively, in some arrangements of embodiments of the present technique, where the infrastructure equipment is part of a non-terrestrial network, a trajectory of the infrastructure equipment is such that the coverage region of the spot beam is substantially constant over a time period, for example if the infrastructure equipment is, or forms part of, a GEO satellite.

In some arrangements of embodiments of the present technique, a non-terrestrial network part may comprise a satellite, an airborne vehicle or an airborne platform. The airborne platform may for example be a High Altitude Pseudo Satellite (HAPS), also termed High Altitude Platform Station, which are positioned typically in the stratosphere at an altitude of above 20 km. An example of a HAPS may be a station tethered to an aircraft or a balloon. In some arrangements of embodiments of the present technique, the communications device is a user equipment. Alternatively, the communications device may act as a relay node for one or more user equipment, each of the one or more user equipment being in one of an RRC connected mode, an RRC idle state or an RRC inactive state.

Flow Chart Representation

Figure 7:
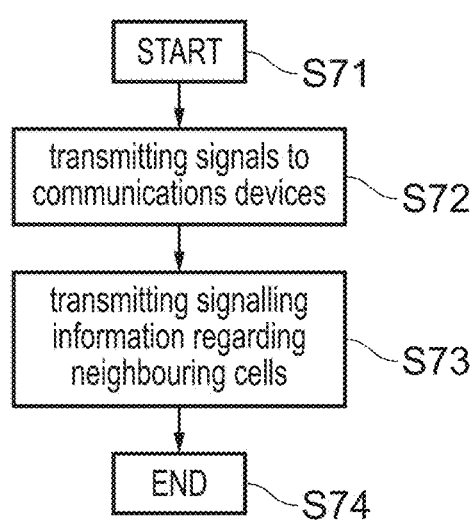
FIG. 7 is a flow diagram representation of a method of operating an infrastructure equipment according to embodiments of the present technique.

FIG. 7 shows a flow diagram illustrating a method of operating an infrastructure equipment forming part of a wireless communications network according to embodiments of the present technique.

The method begins in step S71. The method comprises, in step S72, transmitting signals to one or more communications devices within a radio coverage area provided by the infrastructure equipment via a wireless access interface of the wireless communications network for transmitting signals to the one or more communications devices or receiving signals from the one or more communication devices, the infrastructure equipment forming either part of a non-terrestrial network of the wireless communications network and wherein the radio coverage area forms a spot beam of the non-terrestrial network, or part of a terrestrial network and wherein the radio coverage area is a cell of a terrestrial network. In step S72, the method comprises transmitting signalling information indicating that one or more neighbouring coverage areas to the radio coverage area provided by the infrastructure equipment are either formed by a spot beam of a non-terrestrial network, a spot beam of the non-terrestrial network of which the infrastructure equipment forms part, a cell of a terrestrial network or a cell of the terrestrial network of which the infrastructure equipment forms part. The process ends in step S74.

Those skilled in the art would appreciate that the method shown by FIG. 7 may be adapted in accordance with embodiments of the present technique. For example, other intermediate steps may be included in the method, or the steps may be performed in any logical order. Furthermore, though embodiments of the present technique have been described largely by way of the example communications system shown in FIG. 6, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method for operating an infrastructure equipment forming part of a wireless communications network, the method comprising
  transmitting signals to one or more communications devices within a radio coverage area provided by the infrastructure equipment via a wireless access interface of the wireless communications network, the wireless access interface for transmitting signals to the one or more communications devices or for receiving signals from the one or more communication devices, the infrastructure equipment forming either part of a non-terrestrial network of the wireless communications network, the radio coverage area forming a spot beam or a cell of the non-terrestrial network, or part of a terrestrial network, the radio coverage area being a cell of the terrestrial network, wherein the transmitting the signals includes
  transmitting signalling information indicating that one or more neighbouring coverage areas to the radio coverage area provided by the infrastructure equipment are either formed by a spot beam or a cell of a non-terrestrial network, a spot beam or cell of the non-terrestrial network of which the infrastructure equipment forms part, a cell of a terrestrial network or a cell of the terrestrial network of which the infrastructure equipment forms part.

Paragraph 2. The method of Paragraph 1, wherein the transmitting the signalling information comprises
  broadcasting the signalling information as part of system information broadcast by the infrastructure equipment for the one or more communications devices to access the wireless access interface of the wireless communications network.

Paragraph 3. The method of claim 1, wherein the transmitting the signalling information comprises
  transmitting the signalling information as part of a radio resource configuration, RRC, release message to one of the communications devices to release radio resources of the wireless access interface for transmitting or receiving data in connected mode.

Paragraph 4. The method of any of paragraphs 1 to 3, wherein the signalling information includes an indication of at least one frequency range associated with non-terrestrial networks, and an indication of at least one frequency range associated with terrestrial networks, the at least one frequency range associated with non-terrestrial networks and the at least one frequency range associated with terrestrial networks being for use by the one or more communications devices to identify respectively that the one or more coverage areas neighbouring the radio coverage area are either formed by a non-terrestrial network or a terrestrial network.

Paragraph 5. The method of any of paragraphs 1 to 4, wherein, when the signalling information indicates that one or more of the neighbouring coverage areas are formed by a spot beam of a non-terrestrial network or a spot beam of the non-terrestrial network of which the infrastructure equipment forms part, the signalling information further includes an indication of whether the neighbouring cell is provided by a geo-stationary earth orbit, GEO, satellite or a low-earth orbit, LEO, satellite.

Paragraph 6. The method of any of paragraphs 1 to 5, wherein the infrastructure equipment form part of a non-terrestrial network of the wireless communications network and the radio coverage area of the spot beam or cell varies over time in accordance with a motion of the infrastructure equipment with respect to the surface of the Earth.

Paragraph 7. The method of any of paragraphs 1 to 6, wherein the infrastructure equipment form part of a non-terrestrial network of the wireless communications network and a trajectory of the infrastructure equipment is such that the radio coverage area of the cell or the spot beam is substantially constant over a time period.

Paragraph 8. The method of any of paragraphs 1 to 7, wherein the infrastructure equipment form part of a non-terrestrial network of the wireless communications network and comprises a satellite, an airborne vehicle or an airborne platform.

Paragraph 9. The method of any of paragraphs 1 to 8, wherein the communications device is a user equipment.

Paragraph 10. The method of any of paragraphs 1 to 9, wherein the communications device is acting as a relay node for one or more user equipment, each of the one or more user equipment being in one of an RRC connected mode, an RRC idle state or an RRC inactive state.

Paragraph 11. An infrastructure equipment forming part of a wireless communications network, the infrastructure equipment comprising
  transceiver circuitry configured to transmit signals and receive signals via a wireless access interface provided by the infrastructure equipment, and
  controller circuitry configured in combination with the transceiver circuitry
  to transmit signals to one or more communications devices within a radio coverage area provided by the infrastructure equipment via a wireless access interface of the wireless communications network, the wireless access interface for transmitting signals to the one or more communications devices or for receiving signals from the one or more communication devices, the infrastructure equipment forming either part of a non-terrestrial network of the wireless communications network, the radio coverage area forming a spot beam or a cell of the non-terrestrial network, or part of a terrestrial network, the radio coverage area being a cell of a terrestrial network, wherein the transmitting the signals includes the infrastructure equipment being configured to transmit signalling information indicating that one or more neighbouring coverage areas to the radio coverage area provided by the infrastructure equipment are either formed by a spot beam or a cell of a non-terrestrial network, a spot beam or a cell of the non-terrestrial network of which the infrastructure equipment forms part, a cell of a terrestrial network or a cell of the terrestrial network of which the infrastructure equipment forms part.

Paragraph 12. Circuitry for an infrastructure equipment forming part of a wireless communications network, the infrastructure equipment comprising transceiver circuitry configured to transmit signals and receive signals via a wireless access interface provided by the infrastructure equipment, and controller circuitry configured in combination with the transceiver circuitry to transmit signals to one or more communications devices within a radio coverage area provided by the infrastructure equipment via a wireless access interface of the wireless communications network, the wireless access interface for transmitting signals to the one or more communications devices or for receiving signals from the one or more communication devices, the infrastructure equipment forming either part of a non-terrestrial network of the wireless communications network, the radio coverage area forming a spot beam or a cell of the non-terrestrial network, or part of a terrestrial network, the radio coverage area being a cell of a terrestrial network, wherein the transmitting the signals includes the infrastructure equipment being configured to transmit signalling information indicating that one or more neighbouring coverage areas to the radio coverage area provided by the infrastructure equipment are either formed by a spot beam or a cell of a non-terrestrial network, a spot beam or a cell of the non-terrestrial network of which the infrastructure equipment forms part, a cell of a terrestrial network or a cell of the terrestrial network of which the infrastructure equipment forms part.

Paragraph 13. A method for operating a communications device in a wireless communications network, the method comprising receiving signals from a first infrastructure equipment within a radio coverage area provided by the first infrastructure equipment via a wireless access interface of the wireless communications network, the wireless access interface being for transmitting signals to the first infrastructure equipment or for receiving signals from the first infrastructure equipment, the first infrastructure equipment forming either part of a non-terrestrial network of the wireless communications network, the radio coverage area forming a spot beam or a cell of the non-terrestrial network, or part of a terrestrial network, the radio coverage area being a cell of a terrestrial network, receiving, while the communications device is in an idle state, signalling information from the first infrastructure equipment indicating that one or more neighbouring coverage areas to the radio coverage area provided by the first infrastructure equipment are either formed by a spot beam or a cell of a non-terrestrial network, a spot beam or cell of the non-terrestrial network of which the first infrastructure equipment forms part, a cell of a terrestrial network or a cell of the terrestrial network of which the first infrastructure equipment forms part, and determining, based at least in part on the received signalling information, whether the communications device should perform a cell selection/reselection procedure to select or re-select a second infrastructure equipment providing one of the neighbouring coverage areas.

Paragraph 14. The method of paragraph 13, wherein the receiving the signalling information comprises receiving the signalling information as part of system information broadcast by the first infrastructure equipment for the communications device to access the wireless access interface of the wireless communications network.

Paragraph 15. The method of paragraph 13, wherein the receiving the signalling information comprises receiving the signalling information as part of a radio resource configuration, RRC, release message received from the first infrastructure equipment to release radio resources of the wireless access interface for transmitting or receiving data in connected mode.

Paragraph 16. The method of any of paragraphs 13 to 15, wherein the signalling information includes an indication of at least one frequency range associated with non-terrestrial networks, and an indication of at least one frequency range associated with terrestrial networks, and based on a frequency of signals received from the one or more neighbouring coverage areas, identifying whether each of the one or more neighbouring coverage areas are either formed by a non-terrestrial network or a terrestrial network depending on whether the frequency of the received signals is within the at least one frequency range associated with non-terrestrial networks and the at least one frequency range associated with terrestrial networks.

Paragraph 17. The method of any of paragraphs 13 to 16, wherein the determining whether the communications device should perform the cell selection/reselection procedure to select or re-select the second infrastructure equipment, includes adapting the selection or re-selection procedure to select or to re-select the second infrastructure equipment providing one of the neighbouring coverage areas depending on whether the second infrastructure equipment providing the neighbouring coverage area forms part of a non-terrestrial network or a terrestrial network.

Paragraph 18. The method of paragraph 17, wherein the adapting the selection or re-selection procedure to select or to re-select the second infrastructure equipment includes determining a communications parameter derived from signals received from each of the neighbouring coverage areas, comparing the determined communications parameter for each of the one or more neighbouring coverage areas and the radio coverage area of the first infrastructure equipment with a threshold or with each other, and selecting the neighbouring coverage area provided by the second infrastructure equipment from the comparison, by adapting one of the threshold or the determined communications parameter for the one or more neighbouring coverage areas or the radio coverage area of the first infrastructure equipment in accordance with whether the one or more neighbouring coverage areas or the radio coverage area form part of the a non-terrestrial network or a terrestrial network.

Paragraph 19. The method of paragraph 18, wherein the communications parameter is a received signal strength.

Paragraph 20. The method of paragraph 19, wherein the adapting one of the threshold or the determined communications parameter for the one or more neighbouring coverage areas or the radio coverage area of the first infrastructure equipment compensates for a lower expected received signal strength from a non-terrestrial network.

Paragraph 21. The method of any of paragraphs 13 to 20, wherein, when the signalling information indicates that one or more of the neighbouring coverage areas are formed by a spot beam of a non-terrestrial network or a spot beam of the non-terrestrial network of which the first infrastructure equipment forms part, the signalling information further includes an indication of whether the neighbouring cell is provided by a geo-stationary earth orbit, GEO, satellite or a low-earth orbit, LEO, satellite.

Paragraph 22. The method of any of paragraphs 13 to 21, wherein the determining whether the communications device should perform the cell reselection procedure comprises determining whether at least one communications parameter of the second infrastructure equipment exceeds a threshold, wherein the threshold has a different value dependent on whether second infrastructure equipment is a terrestrial network part or a non-terrestrial network part.

Paragraph 23. A communications device configured to communicate using a wireless communications network, the communications device comprising
    transceiver circuitry configured to transmit signals and receive signals via a wireless access interface provided by the wireless communications network, and
    controller circuitry configured in combination with the transceiver circuitry
    to receive signals from a first infrastructure equipment within a radio coverage area provided by the first infrastructure equipment via a wireless access interface of the wireless communications network, the wireless access interface being for transmitting signals to the first infrastructure equipment or for receiving signals from the first infrastructure equipment, the first infrastructure equipment forming either part of a non-terrestrial network of the wireless communications network, the radio coverage area forming a spot beam or a cell of the non-terrestrial network, or part of a terrestrial network, the radio coverage area being a cell of a terrestrial network,
    to receive, while the communications device is in an idle state, signalling information from the first infrastructure equipment indicating that one or more neighbouring coverage areas to the radio coverage area provided by the first infrastructure equipment are either formed by a spot beam or a cell of a non-terrestrial network, a spot beam or a cell of the non-terrestrial network of which the first infrastructure equipment forms part, a cell of a terrestrial network or a cell of the terrestrial network of which the first infrastructure equipment forms part, and
    to determine, based at least in part on the received signalling information, whether the communications device should perform a cell selection/reselection procedure to select or reselect a second infrastructure equipment providing one of the neighbouring coverage areas.

Paragraph 24. The communications device of paragraph 23, wherein the controller circuitry is configured in combination with the transceiver circuitry
    to receive the signalling information as part of system information broadcast by the first infrastructure equipment for the communications device to access the wireless access interface of the wireless communications network.

Paragraph 25. The communications device of paragraph 24, wherein the controller circuitry is configured in combination with the transceiver circuitry
    to receive the signalling information as part of a radio resource configuration, RRC, release message received from the first infrastructure equipment to release radio resources of the wireless access interface for transmitting or receiving data in connected mode.

Paragraph 26. The communications device of any of paragraphs 23 to 25, wherein the signalling information includes an indication of at least one frequency range associated with non-terrestrial networks, and an indication of at least one frequency range associated with terrestrial networks, and the controller circuitry is configured in combination with the transceiver circuitry
    to receive signals from each of the one or more neighbouring coverage areas, and
    to identify, based on a frequency of the received signals whether each of the one or more neighbouring coverage areas are either formed by a non-terrestrial network or a terrestrial network depending on whether the frequency of the received signals is within the at least one frequency range associated with non-terrestrial networks and the at least one frequency range associated with terrestrial networks.

Paragraph 27. The communications device of any of paragraphs 23 to 26, wherein the controller circuitry is configured in combination with the transceiver circuitry
    to adapt the selection or re-selection procedure to select or to re-select the second infrastructure equipment providing one of the neighbouring coverage areas depending on whether the second infrastructure equipment providing the neighbouring coverage area forms part of a non-terrestrial network or a terrestrial network.

Paragraph 28. The communications device of paragraph 27, wherein the controller circuitry is configured in combination with the transceiver circuitry
    to determine a communications parameter derived from the signals received from each of the neighbouring coverage areas,
    to compare the determined communications parameter for each of the one or more neighbouring coverage areas and the radio coverage area of the first infrastructure equipment with a threshold or with each other, and
    to select the neighbouring coverage area provided by the second infrastructure equipment from the comparison, by adapting one of the threshold or the determined communications parameter for the one or more neighbouring coverage areas or the radio coverage area of the first infrastructure equipment in accordance with whether the one or more neighbouring coverage areas or the radio coverage area form part of the a non-terrestrial network or a terrestrial network.

Paragraph 29. The communications deice of paragraph 28, wherein the communications parameter is a received signal strength.

Paragraph 30. The method of paragraph 29, wherein the adapting one of the threshold or the determined communications parameter for the one or more neighbouring coverage areas or the radio coverage area of the first infrastructure equipment compensates for a lower expected received signal strength from a non-terrestrial network.

Paragraph 31. The communications device of any of paragraphs 23 to 30, wherein, when the signalling information indicates that one or more of the neighbouring coverage areas are formed by a spot beam of a non-terrestrial network or a spot beam of the non-terrestrial network of which the first infrastructure equipment forms part, the signalling information further includes an indication of whether the neighbouring cell is provided by a geo-stationary earth orbit, GEO, satellite or a low-earth orbit, LEO, satellite.

Paragraph 32. The communications device of any of paragraphs 23 to 31, wherein the determining whether the communications device should perform the cell reselection procedure comprises determining whether at least one communications parameter of the second infrastructure equipment exceeds a threshold, wherein the threshold has a different value dependent on whether second infrastructure equipment is a terrestrial network part or a non-terrestrial network part.

Paragraph 33. Circuitry for communicating using a wireless communications network, the circuitry comprising
- transceiver circuitry configured to transmit signals and receive signals via a wireless access interface provided by the wireless communications network, and
- controller circuitry configured in combination with the transceiver circuitry
  - to receive signals from a first infrastructure equipment within a radio coverage area provided by the first infrastructure equipment via a wireless access interface of the wireless communications network, the wireless access interface being for transmitting signals to the first infrastructure equipment or for receiving signals from the first infrastructure equipment, the first infrastructure equipment forming either part of a non-terrestrial network of the wireless communications network, the radio coverage area forming a spot beam or a cell of the non-terrestrial network, or part of a terrestrial network, the radio coverage area being a cell of a terrestrial network,
  - to receive, while the communications device is in an idle state, signalling information from the first infrastructure equipment indicating that one or more neighbouring coverage areas to the radio coverage area provided by the first infrastructure equipment are either formed by a spot beam or a cell of a non-terrestrial network, a spot beam or a cell of the non-terrestrial network of which the first infrastructure equipment forms part, a cell of a terrestrial network or a cell of the terrestrial network of which the first infrastructure equipment forms part, and to determine, based at least in part on the received signalling information, whether the communications device should perform a cell selection/reselection procedure to select or reselect a second infrastructure equipment providing one of the neighbouring coverage areas.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811, "Study on New Radio (NR) to support non terrestrial networks (Release 15)", 3rd Generation Partnership Project, December 2017.
[2] Holma H. and Toskala A, "LTE for UMTS OFDMA and SC-FDMA based radio access", John Wiley and Sons, 2009.
[3] RP-172834, "Revised WID on New Radio Access Technology," NTT DOCOMO, RAN #78.
[4] TR 38.913, "Study on Scenarios and Requirements for Next Generation Access Technologies (Release 14)", 3rd Generation Partnership Project.

What is claimed is:

1. An infrastructure equipment forming part of a wireless communications network, the infrastructure equipment comprising:
   circuitry configured to transmit signals to one or more communications devices within a radio coverage area provided by the infrastructure equipment via a wireless access interface of the wireless communications network, the wireless access interface for transmitting signals to the one or more communications devices or for receiving signals from the one or more communication devices, the infrastructure equipment forming either part of a non-terrestrial network of the wireless communications network, the radio coverage area forming a spot beam or a cell of the non-terrestrial network, or part of a terrestrial network, the radio coverage area being a cell of a terrestrial network, wherein
   transmitting the signals includes transmitting signalling information indicating that one or more neighboring coverage areas to the radio coverage area provided by the infrastructure equipment are either formed by a spot beam or a cell of a non-terrestrial network, a spot beam or a cell of the non-terrestrial network of which the infrastructure equipment forms part, a cell of a terrestrial network or a cell of the terrestrial network of which the infrastructure equipment forms part.

2. The infrastructure equipment of claim 1, wherein the circuitry is configured to broadcast the signalling information as part of system information broadcast by the infrastructure equipment for the one or more communications devices to access the wireless access interface of the wireless communications network.

3. The infrastructure equipment of claim 1, wherein the circuitry is configured to transmit the signalling information as part of a radio resource configuration (RRC) release message to one of the communications devices to release radio resources of the wireless access interface for transmitting or receiving data in connected mode.

4. The infrastructure equipment of claim 1, wherein the signalling information includes an indication of at least one frequency range associated with non-terrestrial networks, and an indication of at least one frequency range associated with terrestrial networks, the at least one frequency range associated with non-terrestrial networks and the at least one frequency range associated with terrestrial networks being for use by the one or more communications devices to identify respectively that the one or more coverage areas neighboring the radio coverage area are either formed by a non-terrestrial network or a terrestrial network.

5. The infrastructure equipment of claim 1, wherein when the signalling information indicates that one or more of the neighboring coverage areas are formed by a spot beam of a non-terrestrial network or a spot beam of the non-terrestrial network of which the infrastructure equipment forms part, the signalling information further includes an indication of whether the neighboring cell is provided by a geo-stationary earth orbit (GEO) satellite or a low-earth orbit (LEO) satellite.

6. The infrastructure equipment of claim 1, wherein the infrastructure equipment forms part of a non-terrestrial network of the wireless communications network and the radio coverage area of the spot beam or cell varies over time in accordance with a motion of the infrastructure equipment with respect to the surface of the Earth.

7. The infrastructure equipment of claim 1, wherein the infrastructure equipment forms part of a non-terrestrial network of the wireless communications network and a trajectory of the infrastructure equipment is such that the radio coverage area of the cell or the spot beam is substantially constant over a time period.

8. The infrastructure equipment of claim 1, wherein the infrastructure equipment forms part of a non-terrestrial network of the wireless communications network and comprises a satellite, an airborne vehicle or an airborne platform.

9. The infrastructure equipment of claim 1, wherein the infrastructure equipment is configured to function as a relay node for one or more user equipment, each of the one or more user equipment being in one of Radio Resource Control (RRC) connected mode, an RRC idle state or an RRC inactive state.

10. A communications device configured to communicate using a wireless communications network, the communications device comprising:
circuitry configured to
receive signals from a first infrastructure equipment within a radio coverage area provided by the first infrastructure equipment via a wireless access interface of the wireless communications network, the wireless access interface being for transmitting signals to the first infrastructure equipment or for receiving signals from the first infrastructure equipment, the first infrastructure equipment forming either part of a non-terrestrial network of the wireless communications network, the radio coverage area forming a spot beam or a cell of the non-terrestrial network, or part of a terrestrial network, the radio coverage area being a cell of a terrestrial network;
receive, while the communications device is in an idle state, signalling information from the first infrastructure equipment indicating that one or more neighboring coverage areas to the radio coverage area provided by the first infrastructure equipment are either formed by a spot beam or a cell of a non-terrestrial network, a spot beam or a cell of the non-terrestrial network of which the first infrastructure equipment forms part, a cell of a terrestrial network or a cell of the terrestrial network of which the first infrastructure equipment forms part; and
determine, based at least in part on the received signalling information, whether the communications device should perform a cell selection/reselection procedure to select or reselect a second infrastructure equipment providing one of the neighboring coverage areas.

11. The communications device of claim 10, wherein the circuitry is configured to receive the signalling information as part of system information broadcast by the first infrastructure equipment for the communications device to access the wireless access interface of the wireless communications network.

12. The communications device of claim 11, wherein the circuitry is configured to receive the signalling information as part of a radio resource configuration (RRC) release message received from the first infrastructure equipment to release radio resources of the wireless access interface for transmitting or receiving data in connected mode.

13. The communications device of claim 10, wherein the signalling information includes an indication of at least one frequency range associated with non-terrestrial networks, and an indication of at least one frequency range associated with terrestrial networks, and
the circuitry is configured to
receive signals from each of the one or more neighboring coverage areas; and
identify, based on a frequency of the received signals whether each of the one or more neighboring coverage areas are either formed by a non-terrestrial network or a terrestrial network depending on whether the frequency of the received signals is within the at least one frequency range associated with non-terrestrial networks and the at least one frequency range associated with terrestrial networks.

14. The communications device of claim 10, wherein the circuitry is configured to adapt the selection or re-selection procedure to select or to re-select the second infrastructure equipment providing one of the neighboring coverage areas depending on whether the second infrastructure equipment providing the neighboring coverage area forms part of a non-terrestrial network or a terrestrial network.

15. The communications device of claim 14, wherein the circuitry is configured to
determine a communications parameter derived from the signals received from each of the neighboring coverage areas;

compare the determined communications parameter for each of the one or more neighboring coverage areas and the radio coverage area of the first infrastructure equipment with a threshold or with each other; and select the neighboring coverage area provided by the second infrastructure equipment from the comparison, by adapting one of the threshold or the determined communications parameter for the one or more neighboring coverage areas or the radio coverage area of the first infrastructure equipment in accordance with whether the one or more neighboring coverage areas or the radio coverage area form part of the a non-terrestrial network or a terrestrial network.

16. The communications device of claim 15, wherein the communications parameter is a received signal strength.

17. The communication device of claim 16, wherein adapting one of the threshold or the determined communications parameter for the one or more neighboring coverage areas or the radio coverage area of the first infrastructure equipment compensates for a lower expected received signal strength from a non-terrestrial network.

18. The communications device of claim 10, wherein when the signalling information indicates that one or more of the neighboring coverage areas are formed by a spot beam of a non-terrestrial network or a spot beam of the non-terrestrial network of which the first infrastructure equipment forms part, the signalling information further includes an indication of whether the neighboring cell is provided by a geo-stationary earth orbit (GEO) satellite or a low-earth orbit (LEO) satellite.

19. The communications device of claim 10, wherein determining whether the communications device should perform the cell reselection procedure comprises determining whether at least one communications parameter of the second infrastructure equipment exceeds a threshold, wherein the threshold has a different value dependent on whether second infrastructure equipment is a terrestrial network part or a non-terrestrial network part.

20. Circuitry for communicating using a wireless communications network, the circuitry comprising:

transceiver circuitry configured to transmit signals and receive signals via a wireless access interface provided by the wireless communications network, and controller circuitry configured in combination with the transceiver circuitry to receive signals from a first infrastructure equipment within a radio coverage area provided by the first infrastructure equipment via a wireless access interface of the wireless communications network, the wireless access interface being for transmitting signals to the first infrastructure equipment or for receiving signals from the first infrastructure equipment, the first infrastructure equipment forming either part of a non-terrestrial network of the wireless communications network, the radio coverage area forming a spot beam or a cell of the non-terrestrial network, or part of a terrestrial network, the radio coverage area being a cell of a terrestrial network;

receive, while the communications device is in an idle state, signalling information from the first infrastructure equipment indicating that one or more neighboring coverage areas to the radio coverage area provided by the first infrastructure equipment are either formed by a spot beam or a cell of a non-terrestrial network, a spot beam or a cell of the non-terrestrial network of which the first infrastructure equipment forms part, a cell of a terrestrial network or a cell of the terrestrial network of which the first infrastructure equipment forms part; and determine, based at least in part on the received signalling information, whether the communications device should perform a cell selection/reselection procedure to select or reselect a second infrastructure equipment providing one of the neighboring coverage areas.

* * * * *